June 13, 1950     M. E. LAWRENCE     2,511,643
APPARATUS FOR TURNING MILK
Filed July 6, 1949
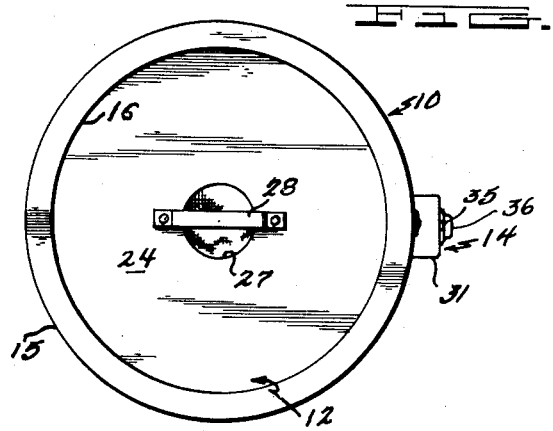
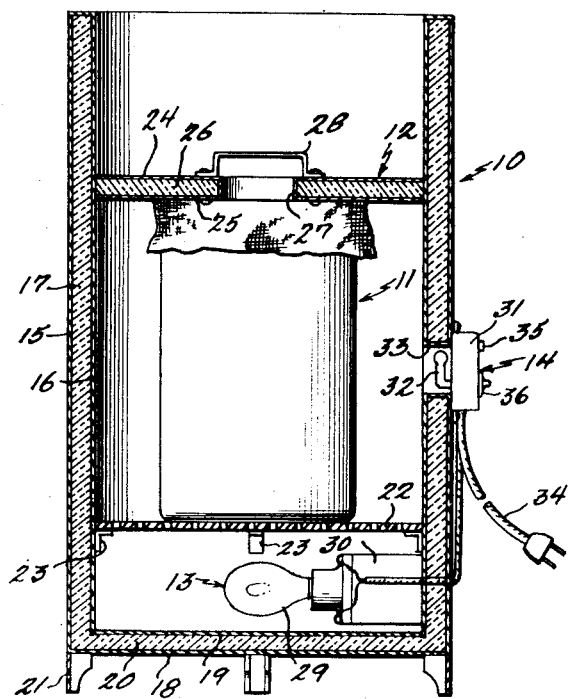
INVENTOR
M. ELVA LAWRENCE
BY Adams & Buch
ATTORNEYS Patented June 13, 1950

2,511,643

UNITED STATES PATENT OFFICE 2,511,643

APPARATUS FOR TURNING MILK

Margaret Elva Lawrence, Summerville, Ga.

Application July 6, 1949, Serial No. 103,289

1 Claim. (Cl. 219—35.1)

This invention relates to devices for treating milk and has more particular reference to a device for treating milk to cause it to turn or clabber.

Before churning whole milk to produce butter and buttermilk, it is necessary that the milk be permitted to turn or clabber. The turning or clabbering is brought about by maintaining the milk at a proper temperature for a proper time. It has been found that milk will turn faster if the temperature is maintained substantially constant at about 85° F. If the temperature is kept below or above 85° F. the time required for turning will be increased.

One object of the present invention is to provide a novel milk turner or clabberer adapted to hold a suitable container, such as an ordinary churn, filled with whole milk, and maintain the milk at a predetermined temperature until it has clabbered.

Another object of the invention is to provide a milk turner, as above characterized, in which means are provided for automatically controlling the temperature of the milk.

Another object of the invention is to provide a milk turner, as above characterized, in which means are provided to permit the milk in the container to have contact with the outside air in order to permit the milk to "breathe."

A further object of the invention is to provide a novel milk turner which is simple and economical in constructtion, rugged and efficient in operation, and one which is lightweight and portable.

Other objects and advantages of the invention will be apparent in the following specification, when considered with the accompanying drawing, wherein:

Fig. 1 is a plan view of a milk turner constructed in accordance with the present invention; and Fig. 2 is a vertical sectional view of the device shown in Fig. 1.

In general, the present invention comprises an insulated cabinet adapted to hold a suitable container filled with whole milk and provided with suitable heating means for maintaining the milk at a predetermined temperature, and with means for permitting the milk to have contact with the outside air to permit it to breathe.

Referring now to the drawings, there is shown, in Figs. 1 and 2, a preferred form of a milk turner constructed in accordance with the present invention and comprising an insulated cabinet 10, adapted to hold a suitable container 11 filled with whole milk; an insulating cover member 12, a heating element 13, and a thermostatic control 14 for controlling the heating element.

The cabinet may be of any desired shape and may be constructed of any suitable material, the essential requirement being that it provide an insulated compartment for holding the container of whole milk. In the particular embodiment illustrated, the cabinet 10 is shown as being circular in horizontal cross section. The circular side wall is formed with spaced outer and inner sheet metal walls 15, 16, respectively, with the space between the metal walls filled with a suitable insulating material 17, such as asbestos, rock wool, or the like. The bottom wall of the turner is formed of outer and inner sheet metal walls 18, 19, with the space between the walls filled with insulating material 20 similar to the insulating material 17 of the side wall.

The cabinet 10 is shown as being provided with legs 21 suitably secured to the bottom wall, and a perforated support disc 22 removably mounted on brackets 23 suitably secured to the inner metal side wall 16. The milk container 11 is supported in the cabinet on the support disc 22, the perforations in the disc permitting the free movement of air therethrough.

The insulating cover member 12 is shown in the form of a disc-shaped member having outer and inner metal walls 24, 25, respectively, with the space between the walls filled with an insulating material 26 similar to the insulating material 17. The cover member is made of a diameter slightly less than the internal diameter of the cabinet so that when it is inserted in the cabinet the outer circumferential edge of the insulating material will tightly engage the wall of the container and prevent the escape of heat therefrom. The cover member is provided with a large circular opening 27 so positioned as to provide communication between the interior of the container and the outside atmosphere when the cover member is properly mounted in the cabinet and engaging the top of the container, as shown in Fig. 2. The cover member may be provided with a suitable handle 28 for convenience in withdrawing the cover member from the cabinet.

Any suitable type of heating means may be provided for heating the interior of the cabinet. In the particular embodiment illustrated, the heating element is shown in the form of an incandescent electric bulb 29 carried by a support 30 suitably mounted on the side wall of the container. In order to maintain a predetermined constant temperature in the cabinet, a thermostat switch 31 is connected in the electric circuit to the incandescent lamp and mounted on the outer side wall of the cabinet, with its bulb 32 received in an opening 33 formed in the side wall of the cabinet. A plug-in-lead 34 extends from the thermostat switch and is adapted to be plugged into any suitable electric outlet socket. The thermostat switch may be of any suitable type, but is shown as having a push button 35 for turning the current off and on and a dial indicator 36 for setting it to operate at a predetermined temperature.

The operation of the device is believed obvious. The milk turner, being portable, is placed at the desired location and the plug-in-lead connected to a wall socket or the like. The container 11, filled with whole milk, is then placed in the cabinet and rests on the support 22. A porous cloth cover is placed over the top of the container and then the cover member 12 is placed on top of the container with the opening 27 therein in registry with the top of the container. Then, the thermostat switch is set to maintain the temperature within the cabinet at the desired temperature, preferably 85° F., and the current turned on and left on until the milk has turned or clabbered.

From the foregoing, it readily will be seen that there has been provided a novel milk turner which is simple and economical in construction, rugged and efficient in operation, and one which is lightweight and portable.

What is claimed is:

A milk turner comprising a cabinet including bottom and side walls and having an open upper end; a milk container including bottom and side walls and having an open upper end, said container being removably mounted within said cabinet with its side walls spaced from the side walls of the cabinet to provide an air space therebetween; a cover member removably mounted within said cabinet and resting upon and supported by the upper open end of said container and serving as a closure for the air space between the walls of said container and said cabinet, said cover member having an opening therein registering with the open upper end of the container and communicating freely with the atmosphere to permit the milk therein to breathe during the turning process; electrical heating means mounted in the cabinet for maintaining the milk at the desired turning temperature; and a thermostatic element for controlling the electrical means.

MARGARET ELVA LAWRENCE.

REFERENCES CITED

The following references are of record in the file of this patent:

UNITED STATES PATENTS

| Number | Name | Date |
| --- | --- | --- |
| 1,530,416 | Saeki | Mar. 17, 1925 |
| 1,712,330 | Chamales | May 7, 1929 |
| 1,969,614 | Klopfenstein | Aug. 7, 1934 |
| 2,224,552 | Sickinger | Dec. 10, 1940 |